United States Patent
Rolion et al.

(10) Patent No.: US 7,938,729 B2
(45) Date of Patent: May 10, 2011

(54) FRICTIONAL CLUTCH WITH O-RING

(75) Inventors: Franck Rolion, Belloy en France (FR); Arnaud Bez, Ville d'Avray (FR)

(73) Assignee: Societe Bic, Clichy Cedex (FR)

( * ) Notice: Subject to any disclaimer, the term of this patent is extended or adjusted under 35 U.S.C. 154(b) by 626 days.

(21) Appl. No.: 11/576,122

(22) PCT Filed: Mar. 27, 2006

(86) PCT No.: PCT/EP2006/002790
§ 371 (c)(1),
(2), (4) Date: Mar. 10, 2008

(87) PCT Pub. No.: WO2006/136217
PCT Pub. Date: Dec. 28, 2006

(65) Prior Publication Data
US 2008/0264753 A1 Oct. 30, 2008

(30) Foreign Application Priority Data
Jun. 20, 2005 (EP) .................................. 05013253

(51) Int. Cl.
*F16D 7/02* (2006.01)
(52) U.S. Cl. ........................................................ 464/30
(58) Field of Classification Search .................. 464/30, 464/41, 42; 242/422.4; 156/540; 118/257
See application file for complete search history.

(56) References Cited

U.S. PATENT DOCUMENTS

| 3,319,484 | A | * | 5/1967 | Prest | 464/30 X |
| 4,327,563 | A | * | 5/1982 | Allmacher, Jr. | 464/30 X |
| 7,121,948 | B2 | * | 10/2006 | Huthmacher et al. | 464/41 |

FOREIGN PATENT DOCUMENTS

| EP | 0 559 918 | 9/1993 |
| EP | 1 186 562 A1 | 3/2002 |
| SU | 868 177 | 9/1981 |
| WO | WO 97/46475 | 12/1997 |

* cited by examiner

Primary Examiner — Greg Binda
(74) Attorney, Agent, or Firm — Jones Day

(57) ABSTRACT

A frictional clutch for a hand-held device for transferring a film from a backing tape onto a substrate comprises a first main member having a cylindrical element coaxially protruding into a circular center opening of a second main member. The first and second main member are supported such that they can carry out a relative rotational movement. The second main member include coaxial tensioning elements for holding and pre-tensioning an elastic ring guided around the tensioning elements. The tensioning elements are geometrically arranged such that the ring is exposed in the form of at least one secant-shaped leg in the center opening.

The secant-shaped leg of the ring is biased radially outwards when the cylindrical element of the first main member is inserted into the center opening of the second member in order to produce a frictional force between the ring and the circumferential wall of the cylindrical element.

8 Claims, 4 Drawing Sheets

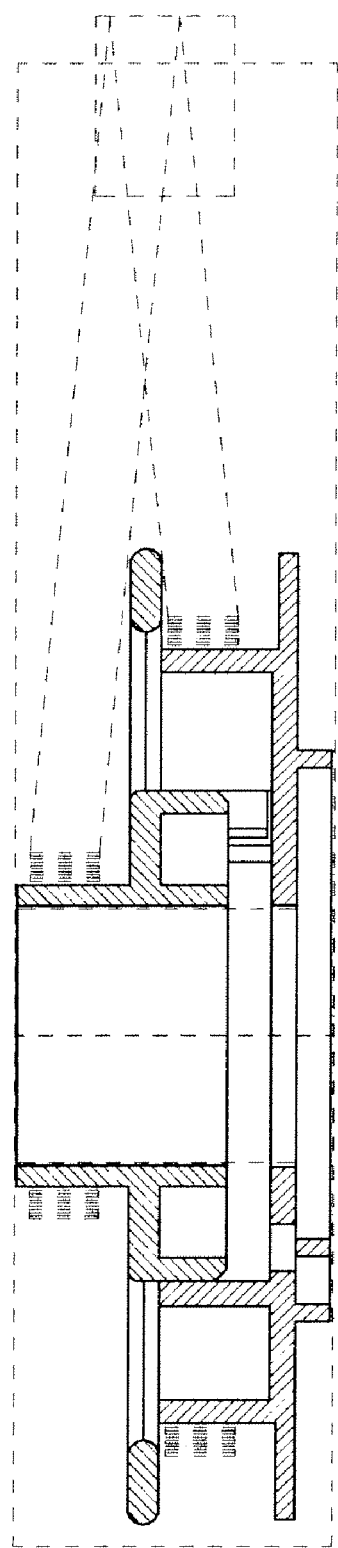
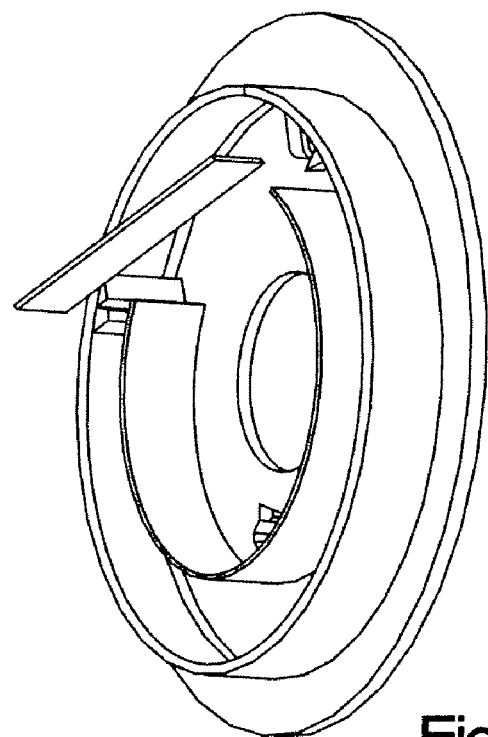
Fig.3A
(PRIOR ART)
Fig.3B
(PRIOR ART)

FRICTIONAL CLUTCH WITH O-RING

This application is a national stage application of PCT/EP2006/002790, filed on Mar. 27, 2006, which claims priority to EP Application No. 05013253.9, which was filed on Jun. 20, 2005, the entire contents of each application being incorporated herein.

FIELD OF THE INVENTION

An embodiment of the present invention relates to a frictional clutch for a torque-restricted power transmission between two members of a hand-held correction-tape dispensing device.

BACKGROUND OF THE INVENTION

EP 1 422 146 A1 describes a frictional clutch as known by a person of ordinary skill in the art (see FIG. 3A, 3B). The known clutch can be used for a hand-held device for transferring a film of e.g. adhesive, covering or colouring material from a backing tape onto a substrate and comprises a supply reel and a take-up reel which are rotatable mounted coaxially to each other, one of the reels comprising a free space bordered by a circular ring surface of the other reel. A spring element is disposed in the free space, the spring element pressing elastically against that circular ring surface.

Such a known frictional clutch thus can serve for creating drive adjustment for a take-up reel of a hand-held device for transferring a film from a backing tape onto a substrate, the take-up reel being driven so forcibly that the backing tape portion being supplied to the take-up reel is always slightly tensioned. In doing so, the frictional clutch ensures that the predetermined tension is not exceeded and the backing tape does not rupture.

One of the first frictional clutches has been described in DE 42 17 295 A1. According to this type of clutch, to which also the clutch according to an embodiment of the present invention counts, the frictional clutch is disposed between a supply reel and a rotating member which is connected with the supply reel of a dispensing device by rotational drive connection. The frictional clutch according to the prior art comprises a sleeve-like spring element in the form of an open spring ring, which is disposed in a ring slot between two coaxially disposed sleeve-like bearing members and thereby constitutes a bearing member whose inner generated surface is on the outer generated surface of the inner bearing member, while the outer bearing member is on the outer generated surface of the sleeve-like spring. By radial bending, the spring ring presses elastically against the cylindrical inner generated surface of the outer bearing member, as a result of which the frictional clutch is formed.

The embodiments of the present invention seek an improvement of the frictional clutch known from EP 1 422 146 A1. The known frictional clutch suffers from the problem that the frictional force generated by the spring bar as one component is highly dependent on the dimensions and tolerances of the elements retaining the spring bar. Therefore, due to the tolerances of the manufacturing process (injection moulding) of the plastic parts a reliable and constant frictional force is not always guaranteed.

According to an embodiment of the present invention this spring bar according to EP 1 422 146 A1 is replaced by an elastic ring element which is guided around the sleeve (cylindrical element) of the co-operating member of the frictional clutch such that it contacts the friction surface of the sleeve as defined, exposed portions.

As the frictional clutch according to an embodiment of the present invention can be used exactly in the same framework as the one known from EP 1 422 146 A1 the additional elements necessary to make up, e.g. correction-tape dispenser are not described in detail. Regarding all the additional elements apart from the frictional clutch therefore explicitly reference is made to EP 1 422 146 A1, the disclosure of which is hereby incorporated by reference.

The object of an embodiment of the present invention, i.e. to provide for a more reliable frictional force is achieved by means of the features of the independent claims. The dependent claims develop further the central idea of the embodiments present invention.

An embodiment of the present invention thus proposes a frictional clutch for a hand-held device for transferring a film from a backing tape onto a substrate. The clutch comprises a first main member having a cylindrical (sleeve) element coaxially protruding into a circular center opening of a second main member. The first and the second main member are supported such that they can carry out a relative rotational movement. Note that in case the clutch is provided for a frictional engagement between a supply reel and a take-up reel of a correction tape dispenser, both the first and the second main member might rotate (with different angular speed). In other applications such as e.g. in case the rotational center axis of the take-up reel and the supply reel are not coaxial, but laterally displaced (as is the case e.g. in EP 1 186 562 B1) one of the first and the second main member may be fixed in rotation in the casing of the correction-tape dispenser.

In any case, the first and the second main member will always carry out a relative rotational movement against the friction of the frictional clutch provided between.

The second member can comprise coaxial tensioning elements for holding a pre-tensioning and elastic ring guided around the tensioning elements.

The tensioning elements are geometrically arranged such that the ring is exposed in the form of at least one secant-shaped leg in the center opening. The secant-shaped leg of the ring is biased radially outwards when the cylindrical element (sleeve) of the first main member is inserted into the center opening of the second member in order to produce a frictional force between the ring and the circumferential wall of the cylindrical element.

Thus, when the cylindrical element (sleeve) is inserted into the center opening the ring will entirely enclose the outer surface (circumferential wall) of the cylindrical element (sleeve).

The ring can be an O-ring.

The ring can be exposed to the center opening by two or more secant-shaped legs.

The ring can be guided along a substantially triangular path defined by the tensioning elements. According to this example the ring will have three secant-shaped legs.

The first main member having the cylindrical element (sleeve) can be part of the supply reel designed to carry a supply of a correction-tape to be dispensed.

The present invention also relates a correction-tape dispenser comprising a frictional clutch as described above.

Further advantages, objects and features of the embodiments of the present invention will become evident for the person skilled in the art when reviewing the enclosed detailed explanation of an embodiment of the present invention.

BRIEF DESCRIPTION OF THE DRAWINGS

FIG. 2 shows a perspective view of the first main members also having a disc-shaped member of a frictional clutch according to an embodiment of the present invention and FIGS. 3A and 3B show a known clutch as disclosed in EP 1 422 146 A1.

DETAILED DESCRIPTION OF THE DRAWINGS

Figure 1A:
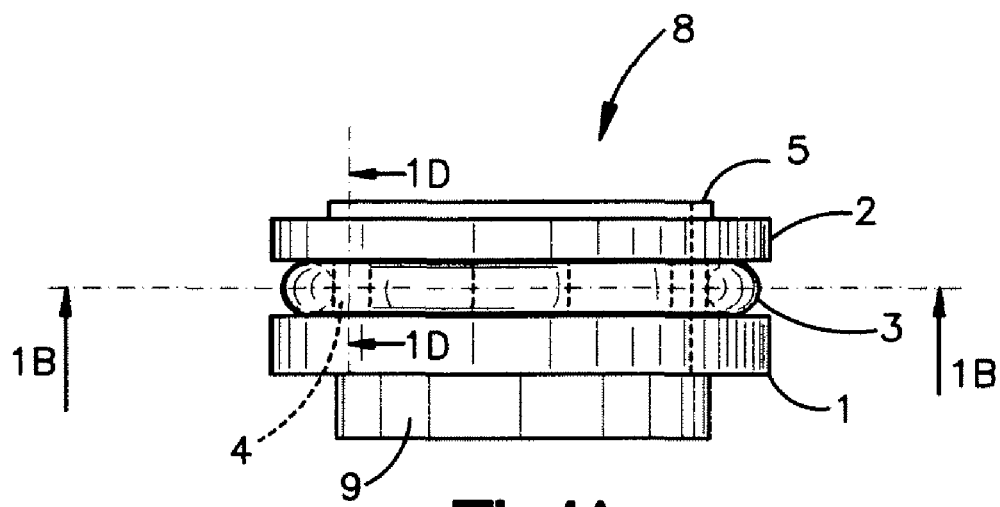
FIG. 1A shows a side view of a frictional clutch according to embodiments of present invention.

In FIGS. 1A to 1D a frictional clutch 8 according to the embodiments of the present invention is shown. The main elements of the frictional clutch 8 as shown in FIG. 1a are a first main member 1 and a second main member 2 between which a O-ring 3 is sandwiched. Note that although the O-ring is sandwiched between the first and the second main members 1, 2, the frictional force is not generated by an axial pinching of the O-ring, but by radial forces acting between the O-ring 3 and a cylindrical (sleeve) member 5 of the first main member 1.

One of the first and the second main members 1, 2 will be driven by the movement of e.g. a correction-tape, which movement is caused by the users moving of the correction-tape dispenser over a substrate. The driven first or second main member will thus carry out a rotational movement against the frictional force of the frictional clutch 8.

Figure 1B:
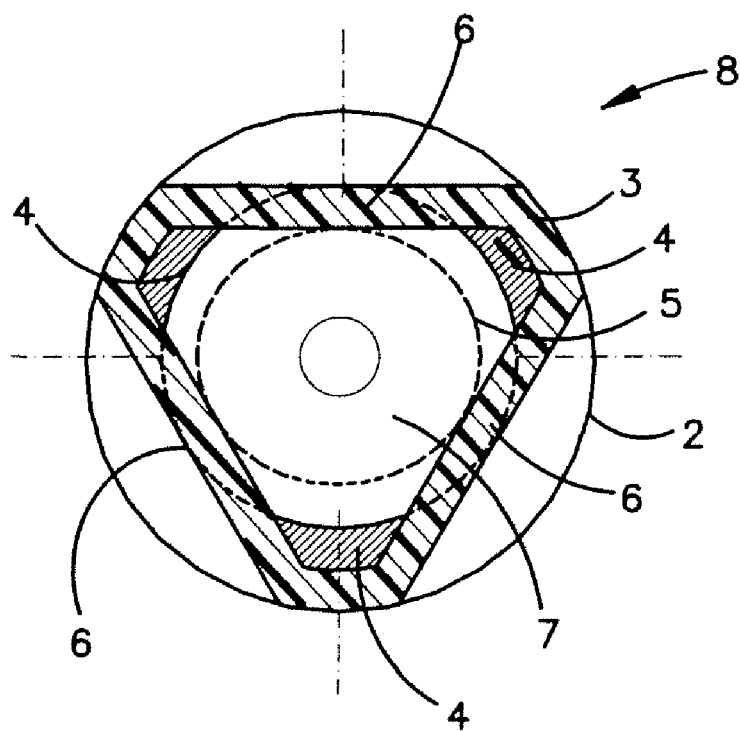
FIG. 1B shows a cross-sectional top view of a frictional clutch looking in the direction of the arrows 1B-1B of FIG. 1A without a sleeve.
Figure 1C:
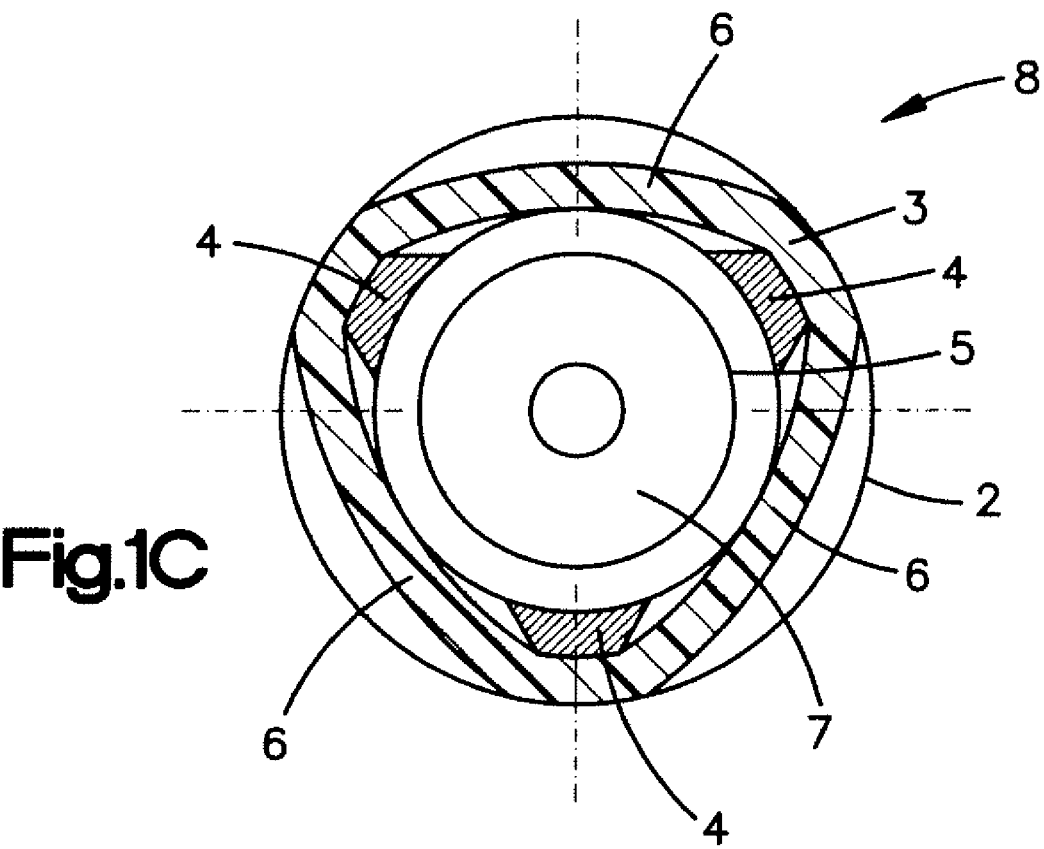
FIG. 1C shows a cross-sectional top view of a frictional clutch with a sleeve looking in the direction of the arrows 1B-1B of FIG. 1A.
Figure 1D:
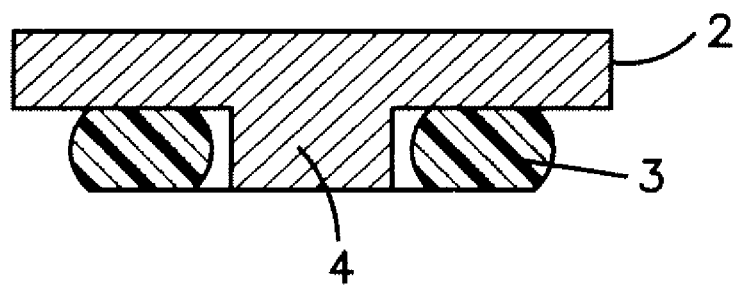
FIG. 1D shows a cross-sectional side view of the second main member of a frictional clutch according to FIG. 1A looking in the directional of the arrows 1D-1D of FIG. 1A without a first main member.

As can be seen from FIGS. 1B and 1D, the second main member 2 is provided with ring-guiding/tensioning elements 4 which are distanced from each other and project downwards (in FIGS. 1A and 1D) from the main portion of the second main member 2.

The second main member 2 is provided with a central opening 7 around which the ring-tensioning/guiding elements 4 are equidistantly arranged.

In the embodiment of FIG. 1B, three ring-tensioning/guiding elements 4 are arranged such that the O-ring 3 which is guided around them will be slightly tensioned and have the contour of essentially a triangle.

Between the tensioning elements 4 thus in the present embodiment three secants 6 of the O-ring 3 are generated.

In the middle-portion of each secant the tension ring 3 is thus exposed and slightly overlaps with the contour of the center opening 7 of the second main member 2. Note that FIG. 1B shows the state of the O-ring 3 when the cylindrical portion (sleeve) 5 of the first main member 1 is not (yet) inserted into the center opening 7.

The outer radius of the sleeve (central portion) 5 of the first main member 1 is dimensioned such that it is only slightly smaller than the inner (free) radius of the center opening 7.

Thus, when the first main member 1 having the sleeve 5 is inserted into the center opening 7 (See FIG. 1C), the circumferential wall of the sleeve 5 will push the secant-shaped legs 6 of the O-ring 3 radially outwards. When the sleeve 5 is fully inserted (thus that it even extends beyond the upper surface of the second main member 2 (as shown in FIGS. 1A and 1C) the O-ring 3 will be biased against the circumferential wall of the sleeve 5 and bear against the circumferential wall at several partially circular regions.

The frictional force thus is defined by the friction coefficient of the O-ring 3 and the outer circumferential wall of the sleeve 5 as well as the biasing force with which the O-ring 3 pushes radially inwards against the circumferential wall of the sleeve 5 of the first main member 1.

In any case the O-ring 3 will completely surround the outer circumferential wall of sleeve 5 in a closed loop.

As the frictional force now is mainly dependent on e.g. the elasticity and the tensioning of the O-ring, tolerances coming from the manufacturing process of the plastic parts (first and second main member 1, 2) are easily compensated.

An O-ring further has the advantage that it is a piece of mass production such that it is not very costly and can be produced with constant characteristics.

Figure 2:
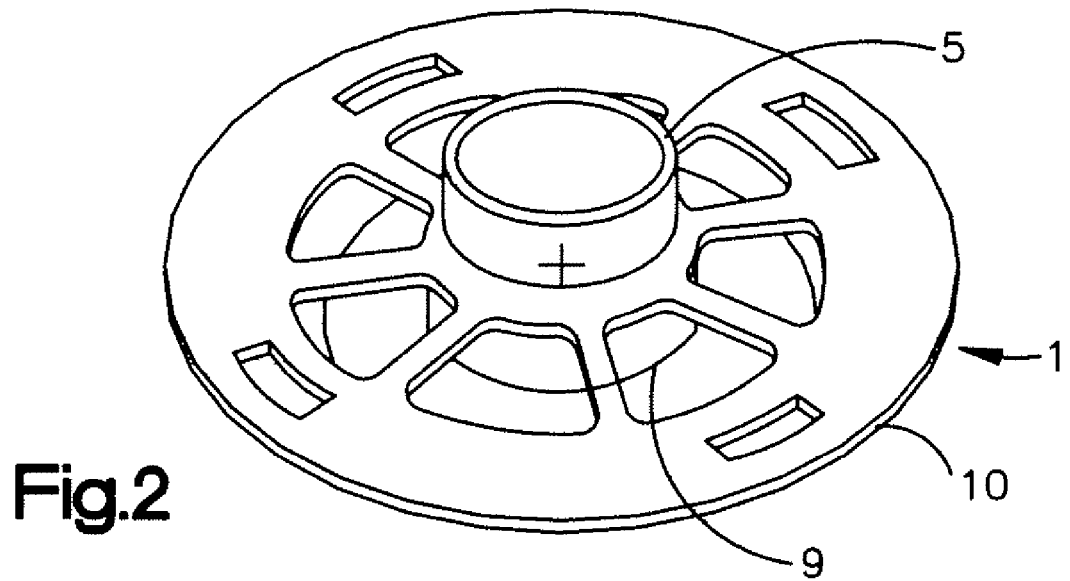

In FIG. 2 the first main member 1 is shown having the sleeve 5 for protruding into the center opening of the 2nd main member 2 as well as a disc-shaped member 10 and a tape-carrying reel 9 onto which e.g. a correction tape can be wound.

The invention claimed is:

1. A frictional clutch for a hand-held device for transferring a film from a backing tape onto a substrate, the clutch comprising:
   a first main member having a cylindrical element coaxially protruding into a circular center opening of a second main member,
   wherein the first and second main member are supported such that they can carry out a relative rotational movement,
   wherein the second main member comprises coaxial tensioning elements for holding and pre-tensioning an elastic ring guided around the tensioning elements,
   wherein the tensioning elements are geometrically arranged such the ring is exposed in the form of at least one secant-shaped leg in the center opening, and
   wherein the secant-shaped leg of the ring is biased radially outwards when the cylindrical element of the first main member is inserted into the center opening of the second member in order to produce a frictional force between the ring and the circumferential wall of the cylindrical element.

2. The frictional clutch according to claim 1, wherein the ring is an O-ring.

3. The frictional clutch according to claim 1, wherein the ring is exposed to the center opening at least two secant-shaped legs.

4. The frictional clutch according to claim 1, wherein the ring is guided along a substantially triangular path.

5. The frictional clutch according to claim 1, wherein the first main member having the cylindrical element is a part of a supply reel designed to carry a supply of a correction tape to be dispensed.

6. The frictional clutch according to claim 1, wherein the ring has linear secantial legs between the tensioning elements.

7. A correction-tape dispenser, comprising a frictional clutch according to claim 1.

8. A frictional clutch for a hand-held device for transferring a film from a backing tape onto a substrate, the clutch comprising:
   a first main member having a cylindrical element coaxially protruding into a circular center opening of a second main member,
   wherein the first and second main member are supported such that they can carry out a relative rotational movement, wherein the second main member comprises coaxial tensioning elements for holding and pre-tensioning an elastic ring guided around the tensioning elements,
wherein the tensioning elements are geometrically arranged such the ring is exposed in the form of at least one secant-shaped leg in the center opening,
wherein the secant-shaped leg of the ring is biased radially outwards when the cylindrical element of the first main member is inserted into the center opening of the second member in order to produce a frictional force between the ring and the circumferential wall of the cylindrical element,
wherein the ring is an O-ring, and
wherein the ring is exposed to the center opening at least two secant-shaped legs.

* * * * *